April 16, 1968     C. V. OUELLETTE     3,378,799

ROTARY SOLENOID

Filed Sept. 8, 1966     2 Sheets-Sheet 1

INVENTOR
CHESTER VICTOR OUELLETTE

*Donald P. Gillette*

ATTORNEY

April 16, 1968 C. V. OUELLETTE 3,378,799
ROTARY SOLENOID

Filed Sept. 8, 1966 2 Sheets-Sheet 2

INVENTOR
CHESTER VICTOR OUELLETTE
BY
ATTORNEY

United States Patent Office 3,378,799
Patented Apr. 16, 1968

3,378,799
ROTARY SOLENOID
Chester V. Ouellette, Manchester, Conn., assignor to Consolidated Electronic Industries Corp., New York, N.Y., a corporation of Delaware
Filed Sept. 8, 1966, Ser. No. 577,938
11 Claims. (Cl. 335—272)

This invention relates to a rotary solenoid and particularly to a solenoid which can be constructed in a microminiature size.

One of the main objects of the present invention is to provide an improved solenoid having an armature capable of being pivoted back and forth through a limited angle in response to a suitable energizing current. Such a solenoid can be used in conjunction with a ratchet to produce continuing rotation in one direction through a series of steps or it can be used simply to move some indicator or other utilization device back and forth through some limited angle.

Rotary solenoids, as such, are not new, but the solenoid of the present invention is especially adapted to be constructed in an exceedingly small size as required by the constantly growing technology in a wide variety of fields. In addition it has a balanced armature structure that minimizes the power needed to drive it, and it includes means to align the solenoid with associated gears in accordance with the special requirements of microminiature apparatus. Basically the structure comprises a coil and two sets of stator poles arranged in a circle and coupled to opposite ends of the coil and extending in the same direction, preferably substantially parallel to the axis of the coil. Both sets have the same number of individual poles, and the angular width of each pole is substantially less than the angular distance between the poles of the same set so that the poles can be angularly spaced in pairs. Each pair includes one pole from each set, and the distance between the two poles of a pair is considerably less than the distance between each pole and the adjacent pole of the next pair. The armature includes a balanced magnetic structure having arms angularly spaced the same number of degrees apart as the poles of one set with the ends of the arms extending in close proximity to the poles. The armature is pivotally mounted to be coaxial with the center of the pole circle.

Energization of the coil by current flowing in one direction causes one set of stator poles to become north magnetic poles and the other set to become south poles, and the magnetic field between the poles of each pair produces a rotational torque on the armature by interaction with the magnetic material of the closest arm and the magnetic field induced therein. The armature is mounted on a shaft that extends through the hollow center of the coil and is connected to means, such as a pawl, at the other end to transmit the rotary motion to a train of gears or other utilization apparatus. Alternatively, under certain circumstances, the mere rotation of the armature between two end positions may be all that is required, as, for example, in the case of an indicating member connected to the armature to be viewed in a predetermined way to show when the armature is in one or the other of its positions of maximum rotation.

The invention will be described in greater detail hereinafter in connection with the drawings in which.

Figure 1:
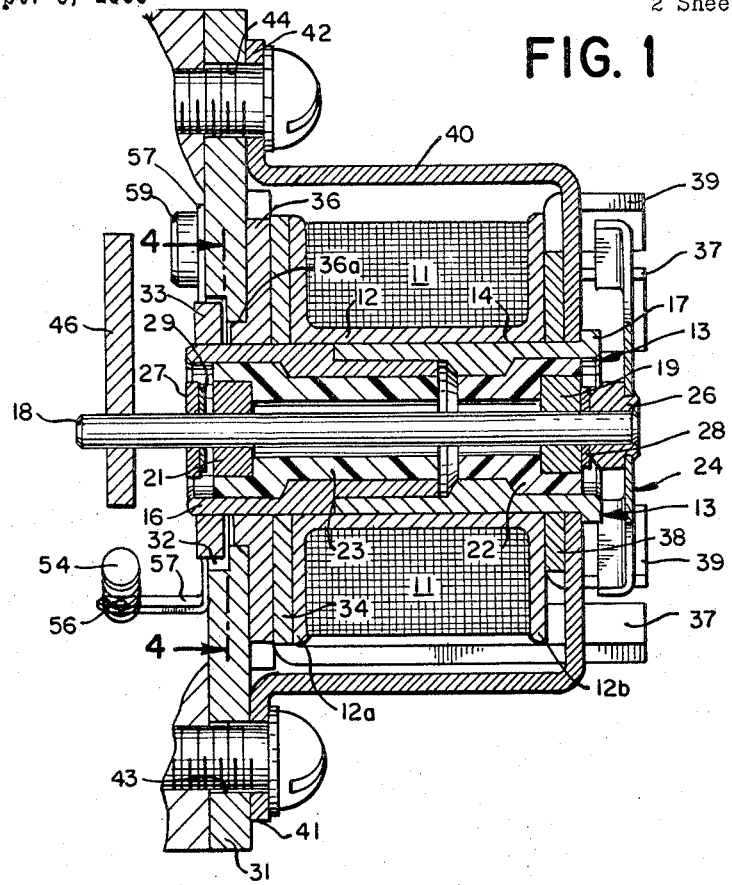
FIG. 1 is a cross-sectional view of a rotary solenoid constructed according to the invention.

The solenoid in FIG. 1 comprises a coil 11 wound in typical solenoid coil fashion on a hollow coil form, or bobbin, 12 having end flanges 12a and 12b. The solenoid has a ferromagnetically soft core structure 13 comprising two telescoping hollow tubular core members 14 and 16 of a suitable material, such as soft steel, on which the bobbin 12 fits relatively snugly. The core member 14 has a flange 17 at one end to assist in holding various parts of the solenoid together once they have been assembled.

Within the hollow core members 14 and 16, is a shaft 18 mounted in two bearings 19 and 21 held within two hollow rubber noise-reducing tubular members 22 and 23. The inner diameters of the core members 14 and 16 are stepped to provide axial locating surfaces for the rubber members 22 and 23 which have matching stepped outer surfaces.

An armature 24 is staked or otherwise firmly affixed to a hub which, in turn, is tightly pressed onto the shaft 18 to prevent relative rotation between the hub, the armature, and the shaft 18. An end-shake washer 27 is attached to the shaft and other parts attached to it, and two thrust washers 28 and 29 are loosely threaded on the shaft, one between the hub 26 and the bearing 19 and the other between the other bearing 21 and the end-shake washer 27.

A base plate, or mounting plate, 31 is provided with a stepped opening 32 through which one end of the core member 16 extends to be firmly gripped by a washer 33 that cooperates with the flange 17 in holding the stator structure together. The stator structure comprises a first stator pole member in the form of a disk 34 of ferromagnetically soft material at one end of the coil 11 just beyond the flange 12a. The stator pole disk has a plurality of stator poles 37 bent or formed to extend in a direction substantially parallel to the common axis of the disk 34, the shaft 18 and the core 13. At the other end of the coil 11, adjacent to the flange 12b, is a second stator pole member in the form of a disk 38 of ferromagnetically soft material which also has a plurality of stator poles 39 extending substantially perpendicularly from it and parallel to and in the same direction as the poles 37. A strap 40 that extends across the pole disk 38 has two mounting flanges 41 and 42 for attachment to the base 31. In addition the flange 17 at one end of the core structure and the washer 33 at the other hold the stator structure together.

Figure 2:
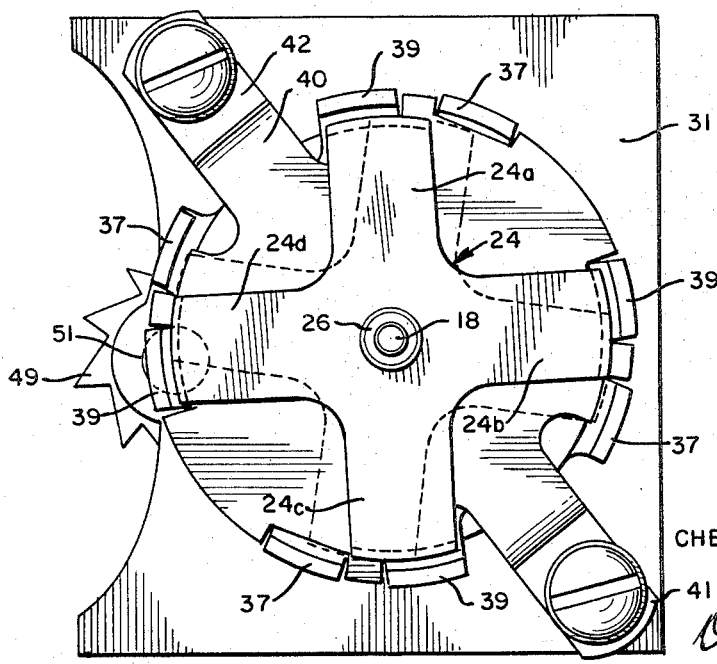
FIG. 2 is a plan view of the armature and one end of the solenoid of FIG. 1.

FIG. 2 shows a plan view of the solenoid. As may be seen, there are, in this embodiment, four equally-spaced poles 37 of one set and the angular width of each of these poles is considerably less than the angular spacing between two adjacent poles 37. There are also four equally-spaced poles 39, each having substantially the same angular width as the poles 37. The poles 39 are placed with respect to the poles 37 so that they form pairs of poles with the two poles in each pair relatively close together as compared to the distance between the poles of one pair and the poles of the next adjacent pair. In fact the distance between the pairs of poles is sufficient to permit the strap 40 to extend between two pairs of the poles.

The armature 24 for this embodiment comprises four arms 24a–24d extending from a central region with the outer ends of the arms trimmed so as to be substantially circular and concentric with the shaft 18 and the sets of poles 37 and 39.

The base 31 has various mounting holes in it, including two mounting holes 43 and 44 properly positioned to receive machine screws threaded through the mounting flanges 41 and 42.

Figure 3:
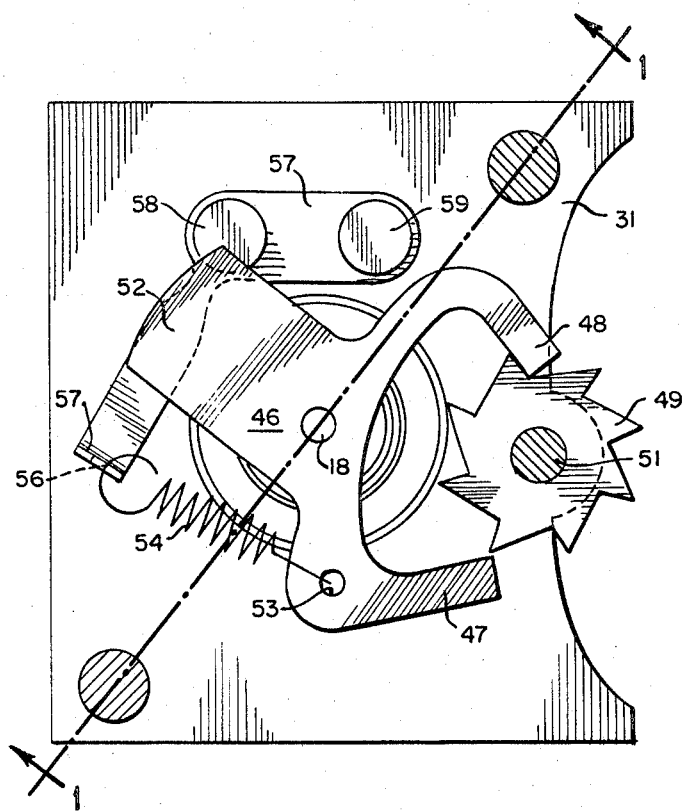
FIG. 3 is a plan view of the other end of the solenoid of FIG. 1.

On the other side of the base plate 31 as shown in FIG. 3 is a yoke, or pawl, 46 having two arms 47 and 48 to engage a ratchet wheel 49 rotatably mounted on a shaft 51 at least one end of which is supported in a bearing in the base plate 31. The pawl 46 is firmly attached to the shaft 18 to be rotated thereby and is balanced with respect to the shaft by an arm 52 which substantially balances the weight of the arms 47 and 48.

The pawl 46 is normally resiliently biased so that its arm 48 presses against the ratchet wheel 49 in response to the force of a spring 54 connected at one end through a hole 53 in the arm 47 and at the other end through a hole 56 in a fixed tab 57 riveted to the base plate 31 by two rivets 58 and 59.

The armature 24, as shown in FIG. 2, has two positions. Its normal end position is shown in full lines and its alternate end position is shown in dotted lines. In the normal position, to which the armature is drawn by the force of the spring 54, the arms 24a–24d are nearly aligned with the stator poles 39. However, preferably the arms of the armature are slightly wider than the stator poles 39 and nearly cover the gap between each of the stator poles 39 and the associated stator pole 37 in the same pair. When the coil 11 is energized, the stator poles 39 assume one magnetic polarity and the stator poles 37 assume the other magnetic polarity. At the same time there is some leakage of flux through the shaft 18, which is made of ferromagnetic material, to the armature 24, which thereupon assumes the same magnetic polarity as the stator poles 39. Even in the absence of any initial leakage magnetic flux in the armature 24, the magnetic field established between each of the stator poles 37 and its corresponding pole 39 in the same pair would produce a relatively concentrated flux field that would link with the nearby end of the closest one of the armature arms 24a–24d. The armature, being free to move to a limited extent, would be drawn into a position to minimize the total reluctance of the magnetic field and this position would correspond to the position shown in dotted lines in FIG. 2.

This magnetic action is enhanced by virtue of the fact that the clockwise edge of the armature arms 24a–24d is normally quite close to one of the stator poles 37. As a result, even at the very beginning of the magnetic action, there is a relatively low reluctance path from each of the stator poles 37 to its associated stator pole 39 by way of one of the armature arms. This greatly improves the efficiency of the magnetic circuit and further enhances the tendency of the armature 24 to rotate to the position shown in dotted lines. Because of the fact that the ends of the arms 24a–24d are rounded to be concentric with the stator poles 37 and 39, there is a substantially uniform magnetic gap which has the advantage of producing a more uniform torque so that the armature 24 moves quickly and forcefully to the alternative position shown in dotted lines and yet the torque does not increase toward the end of this pivotal movement as might be expected. The arm 47 of the pawl 46 does not, therefore, batter against the ratchet wheel 49 but instead presses firmly and smoothly against it to create the necessary force to turn the wheel and any gear train that may be associated with it.

Referring to the position of the ratchet wheel shown in FIG. 3, this movement of the pawl 46 causes the ratchet wheel to rotate clockwise for a distance somewhat less than 45°, an angle that is determined by the fact that the ratchet wheel 49 has eight teeth in the embodiment shown in FIG. 3. When the current to the coil 11 is cut off or removed, the spring 54 returns the pawl 46 to the position shown in FIG. 3 and causes the arm 48 to push the ratchet wheel 49 the remaining angular distance required to make a total movement of 45° for each back and forth movement of the pawl 46.

Figure 4:
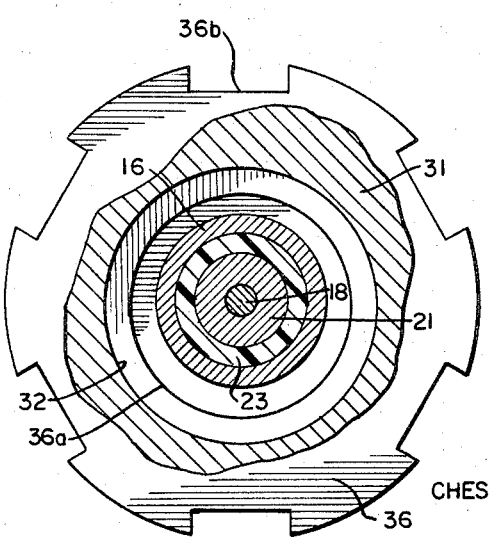
FIG. 4 shows a cross-section of a fragment of the solenoid along the line 4—4 in FIG. 1.

Since the solenoid with its shaft 46 is attached to the base plate 31 separately from the shaft 51, it is desirable to provide means to adjust the relative positions of the shafts 18 and 51 so that the pawl 46 can properly operate the ratchet wheel 49. Essentially, what is required is some means of varying the direct distance between the centers of the shafts 18 and 51. FIG. 4 shows the means for accomplishing this. This means includes a positioning member 36 having a cylindrical extension 36a on one side which fits snugly into the inner circular portion of the opening in the base plate 31, as shown in FIG. 1. The outer cylindrical surface of the core section 16 fits snugly within a circular passageway through the positioning member 36 and through the extension 36a but the center of the opening through the member 36 and the extension 36a is eccentric with respect to the center of the outer cylindrical surface of the extension 36a as may be seen in FIG. 4.

The outwardly extending flange portion of the positioning member 36 has notches 36b to facilitate rotation of the positioning member 36 with respect to the base plate 31 and with respect to the solenoid including particularly the stator disk 34 in contact with the positioning member. Rotation of the positioning member causes the center of the shaft 18 to be moved in a small circle the radius of which is determined by the eccentricity between the outer cylindrical surface of the extension 36a and the center of the passageway therethrough. In essence, however, the only important movement of the shaft 18 is the radial change between its center and the center of the shaft 51. In the embodiment shown, this radial change may be of the order of a few thousandths of an inch.

Because the spring 54 returns the armature 24 to its normal end position each time the current through the coil 11 stops, it is not necessary to reverse the direction of flow of current and thus the solenoid of this invention may be operated on a direct current or a series of pulses of one polarity. The efficiency and small size of the solenoid and particularly of the armature 24 are such that the armature can pivot back and forth quite rapidly. As may be seen in FIG. 1, the armature 24 is a relatively thin sheet metal, but in order to reduce the reluctance of the gap between the ends of the arms 24a–24d and the stator poles 37 and 39 but it does increase the cross section of the gap and thus reduces its reluctance. In a solenoid in which the overall diameter between diametrically opposite stator poles 39 is approximately ⅜ of an inch, the solenoid operates quite well on D.C. pulses having a repetition rate of 20 pulses per second and a duty cycle of about ¼ or less. That is, the pulses may have a duration of 8 to 10 milliseconds each and be spaced approximately 40 to 42 milliseconds apart. However this is not the maximum operating speed of a solenoid of this size and in fact the same solenoid will operate on D.C. pulses having repetition rates of over 150 pulses per second.

While the invention has been described in terms of a specific embodiment, it will be understood by those skilled in the art that modifications may be made therein without departing from the true scope of the invention as defined by the following claims.

What is claimed is:

1. A rotary solenoid comprising: a coil; a central, hollow, ferromagnetically soft core extending through said coil; bearing means attached to said core; a shaft supported by said bearing means and extending through said hollow core; a stator pole structure comprising a first set of ferromagnetically soft stator poles magnetically linked to one end of said coil to have a magnetic field induced in said poles, said poles extending longitudinally along the outside of said coil and beyond the other end thereof; a second set of ferromagnetically soft stator poles magnetically linked to the other end of said coil to have a magnetic field induced therein of the opposite polarity from that induced in said first set of poles, the number of said poles of said second set being equal to the number of poles of said first set and each pole of said second set extending axially in the same direction as said first set and spaced from said first set of poles by a relatively small spacing on one side and a relatively large spacing on the other side, whereby the ends of said poles extending beyond said coil lie in a circle and are spaced in pairs; and a ferromagnetically soft rotor attached to said shaft outside of said core and at the same end thereof as the ends of said stator poles and magnetically linked with the magnetic field of said coil at said same end, said rotor having a plurality of arms, one arm for each pair of said poles.

2. The solenoid of claim 1 in which the angular width of the outer end of each of said arms is slightly greater than the angular width of each of said stator poles.

3. The solenoid of claim 2 in which the angular width of the outer end of each of said arms is approximately equal to the angular width of one of said stator poles plus the angular spacing between said one of said stator poles and the other stator pole of the same pair.

4. The solenoid of claim 2 comprising, in addition: means to return said armature to a position in which said arms are substantially directly opposite the stator poles of one of said sets of stator poles and the spaces between the stator poles of each pair of stator poles when said coil is not energized.

5. The solenoid of claim 4 comprising, in addition: a pawl connected to the other end of said shaft from said rotor; a base; means for attaching said solenoid to said base; and a ratchet wheel rotatably mounted in a position fixed with respect to said base, said pawl engaging said ratchet wheel to actuate the same, said means to return said armature comprising a spring, one end of which is rigidly attached to said base and the other end of which is attached to said pawl.

6. The solenoid of claim 5 in which said base has a circular opening therein and said core has a circular outer surface extending through said opening in said base and has a smaller outer diameter than said opening in said base, said solenoid comprising, in addition: a positioning member having a cylindrical extension on one side with a circular outer surface fitting snugly within said opening in said base and a circular opening through said positioning member and said extension, said circular surface of said core fitting snugly within said circular opening through said positioning member, said outer surface of said extension being eccentric with respect to said opening through said positioning member.

7. The solenoid of claim 6 in which said positioning member comprises a radially outwardly extending flange between said base and said first set of stator poles, and said flange has notches therein to facilitate rotating said flange with respect to said base and said first set of stator poles.

8. The solenoid of claim 7 comprising, in addition: an annular disk of ferromagnetically soft material at said one end of said coil, said first set of stator poles extending from the perimeter of said disk; a second annular disk of ferromagnetically soft material at said other end of said coil, said second set of stator poles extending from the perimeter of said second disk; and a clamp of nonmagnetic material comprising two straps extending across said second annular disk between diametrically opposite pairs of said stator poles and being attached to said base.

9. The solenoid of claim 8 in which said core comprises two telescoping hollow members, one of said hollow members extending through said other end of said coil comprising a radially outwardly extending flange extending partially over said clamp to hold said clamp against said solenoid.

10. The solenoid of claim 1 in which said shaft is made of steel and a portion of the magnetic flux induced in said second set of stator poles links with said shaft and with said armature to increase the magnetic flux applying rotary torque to said armature when said coil is energized.

11. The solenoid of claim 10 comprising, in addition: hollow, tubular, soft, resilient members within said core at each end thereof, said bearing means being supported in said soft resilient tubular members.

References Cited
UNITED STATES PATENTS 3,030,469    4/1962    Lazich _____ 335—125 XR
3,229,171    1/1966    Daugherty _____ 335—272

BERNARD A. GILHEANY, *Primary Examiner.*

GEORGE HARRIS, JR., *Examiner.*